US009800586B2

(12) United States Patent
Boulos et al.

(10) Patent No.: US 9,800,586 B2
(45) Date of Patent: *Oct. 24, 2017

(54) SECURE IDENTITY FEDERATION FOR NON-FEDERATED SYSTEMS

(71) Applicant: salesforce.com, inc., San Francisco, CA (US)

(72) Inventors: Thomas Nabiel Boulos, Corte Madera, CA (US); Prasanta Kumar Behera, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,287

(22) Filed: Sep. 16, 2016

(65) Prior Publication Data

US 2017/0006041 A1    Jan. 5, 2017

Related U.S. Application Data

(63) Continuation of application No. 14/754,653, filed on Jun. 29, 2015, now Pat. No. 9,450,946, which is a
(Continued)

(51) Int. Cl.
*H04L 29/06* (2006.01)
*G06F 21/33* (2013.01)
(Continued)

(52) U.S. Cl.
CPC ............ *H04L 63/102* (2013.01); *G06F 21/30* (2013.01); *G06F 21/33* (2013.01); *G06F 21/41* (2013.01);
(Continued)

(58) Field of Classification Search
CPC ... H04L 63/012; H04L 63/08; H04L 63/0815; H04L 63/0823; H04L 63/10; H04L 63/20;
(Continued)

(56) References Cited

U.S. PATENT DOCUMENTS 5,119,377 A    6/1992   Cobb et al.
5,222,234 A    6/1993   Wang et al.
(Continued)

OTHER PUBLICATIONS

U.S. Appl. No. 13/335,580—Office Action dated Jan. 24, 2013, pp. 10.
(Continued)

*Primary Examiner* — Michael S McNally
(74) *Attorney, Agent, or Firm* — Haynes Beffel & Wolfeld; Ernest J. Beffel, Jr.

(57) ABSTRACT

Methods and apparatus, including computer program products, implementing and using techniques for providing user credentials over a network to a remote computer application. User credentials for the remote computer application are stored in a central repository that is accessible through the network. A request is sent to a service to perform, on behalf of a user, a particular task involving the remote computer application. It is determined whether the service has been granted permission to act on behalf of the user with respect to the remote computer application. When the service has permission to act on behalf of the user, the service is used to retrieve the user's credentials for the remote computer application from the central repository and to supply the retrieved user credentials to the remote computer application.

20 Claims, 2 Drawing Sheets

Related U.S. Application Data continuation of application No. 13/886,209, filed on May 2, 2013, now Pat. No. 9,071,594, which is a continuation of application No. 13/874,418, filed on Apr. 30, 2013, now Pat. No. 8,949,963, which is a continuation of application No. 13/620,208, filed on Sep. 14, 2012, now Pat. No. 8,667,558, which is a continuation of application No. 13/335,592, filed on Dec. 22, 2011, now Pat. No. 8,707,412, which is a continuation of application No. 12/753,495, filed on Apr. 2, 2010, now Pat. No. 8,108,919, which is a continuation of application No. 11/012,639, filed on Dec. 14, 2004, now Pat. No. 7,721,328.

(60) Provisional application No. 60/615,314, filed on Oct. 1, 2004.

(51) Int. Cl.
*G06F 21/30* (2013.01)
*H04L 29/08* (2006.01)
*G06F 21/41* (2013.01)

(52) U.S. Cl.
CPC .......... *H04L 63/08* (2013.01); *H04L 63/0815* (2013.01); *H04L 63/0823* (2013.01); *H04L 63/10* (2013.01); *H04L 63/20* (2013.01); *H04L 67/02* (2013.01); *H04L 67/306* (2013.01); *H04L 69/329* (2013.01)

(58) Field of Classification Search
CPC ..... H04L 67/02; H04L 67/306; H04L 69/329; G06F 21/33; G06F 21/44
USPC .......................................................... 726/1
See application file for complete search history.

(56) References Cited

U.S. PATENT DOCUMENTS

| | | |
|---|---|---|
| 5,255,389 A | 10/1993 | Wang |
| 5,333,312 A | 7/1994 | Wang |
| 5,446,903 A | 8/1995 | Abraham et al. |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,850,518 A | 12/1998 | Northrup |
| 5,873,096 A | 2/1999 | Lim et al. |
| 5,903,652 A | 5/1999 | Mital |
| 5,917,489 A | 6/1999 | Thurlow et al. |
| 5,918,159 A | 6/1999 | Fomukong et al. |
| 5,963,953 A | 10/1999 | Cram et al. |
| 6,032,118 A | 2/2000 | Tello et al. |
| 6,055,513 A | 4/2000 | Katz et al. |
| 6,073,142 A | 6/2000 | Geiger et al. |
| 6,091,714 A | 7/2000 | Sensel et al. |
| 6,092,083 A | 7/2000 | Brodersen et al. |
| 6,105,027 A | 8/2000 | Schneider et al. |
| 6,115,690 A | 9/2000 | Wong |
| 6,138,158 A | 10/2000 | Boyle et al. |
| 6,148,411 A | 11/2000 | Ichinohe et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,178,505 B1 | 1/2001 | Schneider et al. |
| 6,189,011 B1 | 2/2001 | Lim et al. |
| 6,216,135 B1 | 4/2001 | Brodersen et al. |
| 6,226,623 B1 | 5/2001 | Schein et al. |
| 6,233,565 B1 | 5/2001 | Lewis et al. |
| 6,233,617 B1 | 5/2001 | Rothwein et al. |
| 6,247,057 B1 | 6/2001 | Barrera, III |
| 6,256,667 B1 | 7/2001 | Wahlander et al. |
| 6,260,062 B1 | 7/2001 | Davis et al. |
| 6,266,669 B1 | 7/2001 | Brodersen et al. |
| 6,275,941 B1 | 8/2001 | Saito et al. |
| 6,292,789 B1 | 9/2001 | Schutzer |
| 6,295,530 B1 | 9/2001 | Ritchie et al. |
| 6,304,969 B1 | 10/2001 | Wasserman et al. |
| 6,324,568 B1 | 11/2001 | Diec |
| 6,324,693 B1 | 11/2001 | Brodersen et al. |
| 6,336,137 B1 | 1/2002 | Lee et al. |
| 6,338,050 B1 | 1/2002 | Conklin et al. |
| 6,351,739 B1 | 2/2002 | Egendorf |
| D454,139 S | 3/2002 | Feldcamp |
| 6,367,077 B1 | 4/2002 | Brodersen et al. |
| 6,393,605 B1 | 5/2002 | Loomans |
| 6,397,197 B1 | 5/2002 | Gindlesperger |
| 6,397,254 B1 | 5/2002 | Northrup |
| 6,405,220 B1 | 6/2002 | Brodersen et al. |
| 6,421,705 B1 | 7/2002 | Northrup |
| 6,434,550 B1 | 8/2002 | Warner et al. |
| 6,446,089 B1 | 9/2002 | Brodersen et al. |
| 6,449,634 B1 | 9/2002 | Capiel |
| 6,470,357 B1 | 10/2002 | Garcia, Jr. et al. |
| 6,470,385 B1 | 10/2002 | Nakashima et al. |
| 6,493,758 B1 | 12/2002 | McLain |
| 6,499,108 B1 | 12/2002 | Johnson |
| 6,526,044 B1 | 2/2003 | Cookmeyer, II et al. |
| 6,529,489 B1 | 3/2003 | Kikuchi et al. |
| 6,535,909 B1 | 3/2003 | Rust |
| 6,546,413 B1 | 4/2003 | Northrup |
| 6,549,908 B1 | 4/2003 | Loomans |
| 6,549,944 B1 | 4/2003 | Weinberg et al. |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,587,838 B1 | 7/2003 | Esposito et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,633,630 B1 | 10/2003 | Owens et al. |
| 6,651,087 B1 | 11/2003 | Dennis |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,671,713 B2 | 12/2003 | Northrup |
| 6,671,746 B1 | 12/2003 | Northrup |
| 6,684,438 B2 | 2/2004 | Brodersen et al. |
| 6,704,768 B1 | 3/2004 | Zombek et al. |
| 6,711,565 B1 | 3/2004 | Subramaniam et al. |
| 6,714,987 B1 | 3/2004 | Amin et al. |
| 6,718,380 B1 | 4/2004 | Mohaban et al. |
| 6,721,747 B2 | 4/2004 | Lipkin |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,735,621 B1 | 5/2004 | Yoakum et al. |
| 6,754,681 B2 | 6/2004 | Brodersen et al. |
| 6,763,104 B1 | 7/2004 | Judkins et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,813,278 B1 | 11/2004 | Swartz et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |

(56) References Cited

U.S. PATENT DOCUMENTS

| | | |
|---|---|---|
| 6,857,072 B1 | 2/2005 | Schuster et al. |
| 6,871,231 B2 | 3/2005 | Morris |
| 6,877,023 B1 | 4/2005 | Maffeis et al. |
| 6,886,026 B1 | 4/2005 | Hanson |
| 6,917,962 B1 | 7/2005 | Cannata et al. |
| 6,925,488 B2 | 8/2005 | Bantz et al. |
| 6,934,532 B2 | 8/2005 | Coppinger et al. |
| 6,948,063 B1 | 9/2005 | Ganesan et al. |
| 6,952,717 B1 | 10/2005 | Monchilovich et al. |
| 6,965,878 B1 | 11/2005 | Heuring |
| 6,990,513 B2 | 1/2006 | Belfiore et al. |
| 7,028,312 B1 | 4/2006 | Merrick et al. |
| 7,035,202 B2 | 4/2006 | Callon |
| 7,062,502 B1 | 6/2006 | Kesler |
| 7,069,231 B1 | 6/2006 | Cinarkaya et al. |
| 7,069,497 B1 | 6/2006 | Desai |
| 7,082,532 B1 | 7/2006 | Vick et al. |
| 7,088,727 B1 | 8/2006 | Short et al. |
| 7,099,950 B2 | 8/2006 | Jones et al. |
| 7,127,613 B2 | 10/2006 | Pabla et al. |
| 7,152,204 B2 | 12/2006 | Upton |
| 7,181,758 B1 | 2/2007 | Chan |
| 7,249,195 B2 | 7/2007 | Panec et al. |
| 7,289,976 B2 | 10/2007 | Kihneman et al. |
| 7,305,454 B2 | 12/2007 | Reese et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,590,685 B2 | 9/2009 | Palmeri et al. |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,108,919 B2 | 1/2012 | Boulos et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0005358 A1 | 6/2001 | Shiozawa |
| 2001/0029478 A1 | 10/2001 | Laster et al. |
| 2001/0044791 A1 | 11/2001 | Richter et al. |
| 2002/0010776 A1 | 1/2002 | Lerner |
| 2002/0013854 A1 | 1/2002 | Eggleston et al. |
| 2002/0019797 A1 | 2/2002 | Stewart et al. |
| 2002/0029201 A1 | 3/2002 | Barzilai et al. |
| 2002/0058277 A1 | 5/2002 | Bathe et al. |
| 2002/0072951 A1 | 6/2002 | Lee et al. |
| 2002/0073080 A1 | 6/2002 | Lipkin |
| 2002/0082892 A1 | 6/2002 | Raffel et al. |
| 2002/0087371 A1 | 7/2002 | Abendroth |
| 2002/0091533 A1 | 7/2002 | Ims et al. |
| 2002/0129352 A1 | 9/2002 | Brodersen et al. |
| 2002/0138166 A1 | 9/2002 | Mok et al. |
| 2002/0138389 A1 | 9/2002 | Martone et al. |
| 2002/0140731 A1 | 10/2002 | Subramaniam et al. |
| 2002/0143997 A1 | 10/2002 | Huang et al. |
| 2002/0161611 A1 | 10/2002 | Price et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0005297 A1 | 1/2003 | Fichtner et al. |
| 2003/0012382 A1 | 1/2003 | Ferchichi et al. |
| 2003/0018705 A1 | 1/2003 | Chen et al. |
| 2003/0018808 A1 | 1/2003 | Brouk et al. |
| 2003/0018830 A1 | 1/2003 | Chen et al. |
| 2003/0023880 A1 | 1/2003 | Edwards et al. |
| 2003/0037250 A1 | 2/2003 | Walker et al. |
| 2003/0041178 A1 | 2/2003 | Brouk et al. |
| 2003/0053459 A1 | 3/2003 | Brouk et al. |
| 2003/0058277 A1 | 3/2003 | Bowman-Amuah |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0126136 A1 | 7/2003 | Omoigui |
| 2003/0151633 A1 | 8/2003 | George et al. |
| 2003/0159136 A1 | 8/2003 | Huang et al. |
| 2003/0163566 A1 | 8/2003 | Perkins et al. |
| 2003/0187921 A1 | 10/2003 | Diec |
| 2003/0189600 A1 | 10/2003 | Gune et al. |
| 2003/0191816 A1 | 10/2003 | Landress et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0229783 A1 | 12/2003 | Hardt |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0024896 A1 | 2/2004 | Stafford et al. |
| 2004/0027388 A1 | 2/2004 | Berg et al. |
| 2004/0078373 A1 | 4/2004 | Ghoneimy et al. |
| 2004/0117371 A1 | 6/2004 | Bhide et al. |
| 2004/0128001 A1 | 7/2004 | Levin et al. |
| 2004/0128383 A1 | 7/2004 | Hinton |
| 2004/0162741 A1 | 8/2004 | Flaxer et al. |
| 2004/0163087 A1 | 8/2004 | Sandland et al. |
| 2004/0167987 A1 | 8/2004 | Reese et al. |
| 2004/0186860 A1 | 9/2004 | Lee et al. |
| 2004/0186891 A1 | 9/2004 | Panec et al. |
| 2004/0187018 A1 | 9/2004 | Owen et al. |
| 2004/0193510 A1 | 9/2004 | Catahan et al. |
| 2004/0193606 A1 | 9/2004 | Arai et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0243574 A1 | 12/2004 | Giroux et al. |
| 2004/0249854 A1 | 12/2004 | Barnes-Leon et al. |
| 2004/0254934 A1 | 12/2004 | Ho et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0004893 A1 | 1/2005 | Sangroniz |
| 2005/0005164 A1 | 1/2005 | Syiek et al. |
| 2005/0021956 A1 | 1/2005 | Genty et al. |
| 2005/0039206 A1 | 2/2005 | Opdycke |
| 2005/0050555 A1 | 3/2005 | Exley et al. |
| 2005/0076049 A1 | 4/2005 | Qubti et al. |
| 2005/0080914 A1 | 4/2005 | Lerner et al. |
| 2005/0081066 A1 | 4/2005 | Lahdensivu et al. |
| 2005/0086297 A1 | 4/2005 | Hinks |
| 2005/0091098 A1 | 4/2005 | Brodersen et al. |
| 2005/0131941 A1 | 6/2005 | Dettinger et al. |
| 2005/0138210 A1 | 6/2005 | Shkvarchuk et al. |
| 2005/0166209 A1 | 7/2005 | Merrick et al. |
| 2005/0198348 A1 | 9/2005 | Yeates et al. |
| 2005/0198488 A1 | 9/2005 | Sandland et al. |
| 2005/0223009 A1 | 10/2005 | Powers et al. |
| 2005/0223413 A1 | 10/2005 | Duggan et al. |
| 2005/0228863 A1 | 10/2005 | Palmeri et al. |
| 2005/0234928 A1 | 10/2005 | Shkvarchuk et al. |

(56) References Cited

U.S. PATENT DOCUMENTS

| | | |
|---|---|---|
| 2006/0015353 A1 | 1/2006 | Reese |
| 2006/0015499 A1 | 1/2006 | Clissold et al. |
| 2006/0020508 A1 | 1/2006 | Gorti et al. |
| 2006/0021019 A1 | 1/2006 | Hinton et al. |
| 2006/0074703 A1 | 4/2006 | Bhandarkar et al. |
| 2006/0074915 A1 | 4/2006 | Bhandarkar et al. |
| 2006/0155871 A1 | 7/2006 | Ilkka et al. |
| 2006/0161549 A1 | 7/2006 | Bartkowiak et al. |
| 2007/0078950 A1 | 4/2007 | Hopkins et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0096533 A1 | 4/2012 | Boulos et al. |
| 2012/0096534 A1 | 4/2012 | Boulos et al. |
| 2012/0233137 A1 | 9/2012 | Jakobson et al. |
| 2012/0290407 A1 | 11/2012 | Hubbard et al. |
| 2013/0014211 A1 | 1/2013 | Boulos et al. |
| 2013/0014230 A1 | 1/2013 | Boulos et al. |
| 2013/0212497 A1 | 8/2013 | Zelenko et al. |
| 2013/0247139 A1 | 9/2013 | Boulos et al. |
| 2013/0247155 A1 | 9/2013 | Boulos et al. |
| 2013/0247216 A1 | 9/2013 | Cinarkaya et al. |

OTHER PUBLICATIONS

U.S. Appl. No. 13/620,174—Office Action dated May 8, 2013, pp. 10.
U.S. Appl. No. 13/620,208—Office Action dated Jul. 22, 2013, pp. 9.
U.S. Appl. No. 13/335,580, Notice of Allowance, Aug. 9, 2013.
U.S. Appl. No. 13/620,174, Notice of Allowance, Aug. 19, 2013.
U.S. Appl. No. 13/886,209—Office Action dated Sep. 15, 2014, 9 pages.
U.S. Appl. No. 13/874,418—Office Action dated Jul. 23, 2014, pp. 9.
U.S. Appl. No. 13/874,418—Notice of Allowance dated Sep. 26, 2014, pp. 9.
U.S. Appl. No. 10/727,089—Office Action dated Sep. 21, 2004, pp. 8.
U.S. Appl. No. 10/727,089—Office Action dated Jun. 2, 2005, pp. 11.
U.S. Appl. No. 10/727,089—Office Action dated Nov. 28, 2005, pp. 10.
U.S. Appl. No. 10/728,356—Office Action dated Jun. 6, 2005, pp. 10.
U.S. Appl. No. 10/728,356—Office Action dated Sep. 30, 2005, pp. 6.
U.S. Appl. No. 10/820,650—Office Action dated Feb. 5, 2008, pp. 17.
U.S. Appl. No. 10/820,650—Office Action dated Oct. 28, 2008, pp. 16.
U.S. Appl. No. 10/820,650—Notice of Allowance dated Mar. 13, 2009.
U.S. Appl. No. 10/820,650—Notice of Allowance dated Jun. 18, 2009, pp. 5.
U.S. Appl. No. 09/820,966—Office Action dated May 19, 2005, pp. 12.
U.S. Appl. No. 09/820,966—Office Action dated Jun. 20, 2005, pp. 12.
U.S. Appl. No. 09/820,966—Office Action dated Sep. 30, 2005, pp. 25.
U.S. Appl. No. 09/820,966—Examiner Interview Summary dated Sep. 30, 2005.
U.S. Appl. No. 09/820,966—Examiner Interview Summary dated Aug. 3, 2005.
U.S. Appl. No. 09/820,964—Office Action dated Feb. 9, 2005, pp. 10.
U.S. Appl. No. 09/820,964—Office Action dated Jul. 13, 2005, pp. 12.
U.S. Appl. No. 09/820,964—Office Action dated Jun. 27, 2006, pp. 13.
U.S. Appl. No. 09/820,964—Office Action dated Sep. 3, 2008, pp. 12.
U.S. Appl. No. 09/820,964—Office Action dated Jul. 10, 2007, pp. 16.
U.S. Appl. No. 09/820,965—Office Action dated Oct. 26, 2004, pp. 8.
U.S. Appl. No. 09/820,965—Office Action dated Jun. 6, 2006, pp. 10.
U.S. Appl. No. 09/820,965—Office Action dated Sep. 28, 2005, pp. 8.
U.S. Appl. No. 09/820,965—Office Action dated Jun. 14, 2006, pp. 9.
U.S. Appl. No. 09/820,965—Office Action dated Jul. 11, 2007, pp. 6.
U.S. Appl. No. 09/820,965—Office Action dated Dec. 28, 2007, pp. 12.
U.S. Appl. No. 11/012,639—Office Action dated May 14, 2008, pp. 11.
U.S. Appl. No. 11/012,639—Office Action dated Oct. 24, 2008, pp. 13.
U.S. Appl. No. 11/012,639—Office Action dated Feb. 17, 2009, pp. 12.
U.S. Appl. No. 11/012,639—Examiner Interview Summary dated May 11, 2009, pp. 2.
U.S. Appl. No. 11/012,639—Office Action dated Jul. 20, 2009, pp. 14.
U.S. Appl. No. 11/012,639—Examiner Interview Summary dated 05 Oct. 5, 2009, pp. 2.
U.S. Appl. No. 11/012,639—Notice of Allowance dated Dec. 28, 2009, pp. 11.
U.S. Appl. No. 11/014,149—Office Action dated Oct. 1, 2007, pp. 28.
Slam Dunk NetworksSM: A Global Infrastructure for the Guaranteed Delivery of B2B Transactions over the Internet, Copyright 2000 Slam Dunk Networks, Inc., 19 pages.
Coblist:—Cob: Welcome to my photo album! (2000) retrieved from internet at http://www.deatech.com/natural/ coblist/coblist-we/ 2000/0484.html; dated Sep. 25, 2000, pp. 1-2.
CrossWeave.TM.—Extending the Enterprise (2001), company overview downloaded from CrossWeave.com website at http:// www.crossweave.com/company.sub.--overview.html; Retrieved from internet on Apr. 1, 2002, 1 page.
"Evite.com Launches Free Web-based Group Activity Organizer," retrieved from the Internet at www.proquest.com, PR Newswire, ProQuest Doc. ID: 43258854, Jul. 19, 1999, pp. 1-2.
"Evite Relies on MySQL to Deliver Millions of Invitations," retrieved from www.mysql.com, My SQL, The World's Most Popular Open Source Database, MySQL.com, 1998, 4 pages.
"Evite Tour," Mar. 2001, retrieved from the Internet at http://web/ archive.org/web/2001027073617/www.evite.com/
tour?printAll+ok, Evite Mar. 2001, pp. 1-9.
"Excite@Home: Excite's #1 webshots provides users with comprehensive photo capabilities; Unveiling "My Photos" where Excite users can create personal albums, share photos, search photos and order quality prints by Ofoto," [Retrieved from internet atwww. proquest.com, on May 24, 2005] ProQuest Doc. ID: 54811626, Jorgensen, M2 Presswire, Coventry: Jun. 5, 2000, 3 pages.
Festa, Paul, "Start-up gains Netscape funding, Microsoft engineers," NET News.com, (Sep. 10, 2000), pp. 1-2.
GlueCode: Our Mission and Vision (2002) downloaded from Gluecode.com website at URL:http://www.gluecode.com/company/ mission.sub.--vision.html, p. 1, Retrieved from internet on Apr. 1, 2002, 1 page.
Greet, Arthur, "Partner Interface Process Technical Architecture", (1998), RosettaNet/PIP Technical Architecture.doc, pp. 1-12.

(56) References Cited

OTHER PUBLICATIONS ipo.com—Venture Portfolio Company Profile (2002), downloaded from ipo.com website at http://www.ipo.com/venture/pcprofile.asp?p=IPO&pc=20323; Retrieved from internet on Apr. 1, 2002, 1 page.
LaQuey, Robert E. (1999), "SML: Simplifying XML," retrieved from Internet at www.XML.com, dated Nov. 24, 1999, pp. 1-6.
Stross, Kenner, "Managed B2B Infrastructure Technical Architecture", (Jul. 31, 2000), Transact Technical Architecture, pp. 1-14.
"Trails.com Teams Up With Evite to Offer Email Trip Planning Service," retrieved from Internet at www.trails.com, Homes, 2000.
Viquity Press Release (2000) "Viquity Demonstrates Power of Hub Technology in ebXML Proof-of-Concept," dated Dec. 12, 2000, downloaded from Viquity.com website at http://www.viquity.com/news.sub.--events/pr.sub.--detail.asp; Retrieved from interneton Apr. 1, 2002, 2 pages.
U.S. Appl. No. 13/620,208—Notice of Allowance dated Oct. 31, 2013. pp. 10.
U.S. Appl. No. 13/620,208—Office Action dated Jul. 22, 2013, pp. 8.
U.S. Appl. No. 13/620,174—Notice of Allowance dated Aug. 19, 2013, pp. 10.
U.S. Appl. No. 13/335,592—Office Action dated Jan. 24, 2013, pp. 10.
U.S. Appl. No. 13/335,592—Notice of Allowance dated Aug. 8, 2013, pp. 8.
U.S. Appl. No. 13/335,592—Notice of Allowance dated Nov. 25, 2013, pp. 8.
U.S. Appl. No. 13/620,208—Notice of Allowance dated Oct. 31, 2013, pp. 10.
U.S. Appl. No. 13/335,592—Notice of Allowance dated Aug. 8, 2013, pp. 10.
U.S. Appl. No. 13/335,592—Office Action dated Jan. 24, 2013 pp. 9.
U.S. Appl. No. 13/335,580—Ofice Actiondated Jan. 24, 2013, pp. 10.
U.S. Appl. No. 13/335,580—Notice of Allowance dated Aug. 9, 2013, pp. 8.
U.S. Appl. No. 13/335,580—Notice of Allowance dated Nov. 26, 2013, pp. 8.
U.S. Appl. No. 13/620,174—Reponse to Office Action dated May 8, 2013, filed Aug. 6, 2013, pp. 9.
U.S. Appl. No. 13/620,208—Response to Office Action dated Jul. 22, 2013, filed Oct. 22, 2013 pp. 7.
U.S. Appl. No. 13/335,592—Response to Office Action dated Jan. 24, 2013, filed Jul. 23, 2013, pp. 9.
U.S. Appl. No. 11/012,639—Response to Office Action dated Jul. 20, 2009, filed Oct. 19, 2009, pp. 12.
U.S. Appl. No. 11/012,639—Response to Office Action dated Feb. 17, 2009, filed May 15, 2009, pp. 14.
U.S. Appl. No. 11/012,639—Response to Office Action dated Oct. 24, 2008 Dec. 22, 2008 pp. 15.
U.S. Appl. No. 11/012,639—Response to Office Action dated May 14, 2008, filed Oct. 2, 2008, pp. 12.
U.S. Appl. No. 13/335,580—Response to Office Action dated Jan. 24, 2013, filed Jul. 23, 2013, pp. 12.
U.S. Appl. No. 13/620,174—Response to Office Action dated May 8, 2013, filed Aug. 6, 2013, pp. 8.
U.S. Appl. No. 10/728,356—Notice of Allowance dated May 21, 2007, pp. 4.
U.S. Appl. No. 10/728,356—Office Action May 24, 2006, pp. 14.
U.S. Appl. No. 10/728,356—Response to Office Action May 24, 2006, filed Nov. 17, 2006, pp. 14.
U.S. Appl. No. 13/886,209—Response to Office Action dated Sep. 15, 2014, filed Feb. 12, 2015) 7 pages.
U.S. Appl. No. 10/820,650—Response to Office Action dated Oct. 28, 2008, filed Dec. 24, 2008, pp. 16.
U.S. Appl. No. 10/727,089—Response to Office Action dated Mar. 23, 2006, pp. 15.
U.S. Appl. No. 10/727,089—Response to Office Action dated Apr. 4, 2007, pp. 142.
U.S. Appl. No. 10/727,089—Office Action dated Jan. 17, 2007, pp. 12.
U.S. Appl. No. 10/727,089—Response to Office Action dated Dec. 2, 2004, pp. 24.
U.S. Appl. No. 10/727,089—Response to Office Action dated Jun. 2, 2005, filed Sep. 30, 2005, pp. 16.
U.S. Appl. No. 09/820,966—Response to Office Action dated Jan. 9, 2009, filed Aug. 27, 2009, pp. 57.
U.S. Appl. No. 09/820,965—Response to Office Action dated Dec. 28, 2007, filed May 28, 2007, pp. 8.
U.S. Appl. No. 09/820,965—Response to Office Action dated Jun. 14, 2006, filed Oct. 10, 2006, pp. 9.
U.S. Appl. No. 09/820,965—Response to Office Action dated Oct. 26, 2004, filed Aug. 23, 2005, pp. 9.
U.S. Appl. No. 09/820,966—Office Action dated Dec. 14, 2004, pp. 12.
U.S. Appl. No. 09/820,966—Response to Office Action dated Dec. 14, 2004, filed Jan. 25, 2005, pp. 19.
U.S. Appl. No. 09/820,966—Office Action dated Jul. 3, 2006, pp. 16.
U.S. Appl. No. 09/820,966—Response to Office Action dated Jul. 3, 2006, filed Jan. 30, 2007, pp. 17.
U.S. Appl. No. 09/820,966—Office Action dated Aug. 27, 2007, pp. 13.
U.S. Appl. No. 09/820,966—Response to Office Action dated Aug. 27, 2007, filed Nov. 5, 2007, pp. 13.
U.S. Appl. No. 09/820,966—Office Action dated Jan. 9, 2009, pp. 33.
U.S. Appl. No. 09/820,964—Response to Office Action dated Mar. 30, 2009, filed Aug. 31, 2009, pp. 9.
U.S. Appl. No. 09/820,964—Office Action dated Mar. 30, 2009, pp. 15.
U.S. Appl. No. 09/820,964—Response to Office Action dated Dec. 27, 2007, filed May 27, 2008, pp. 11.
U.S. Appl. No. 09/820,964—Office Action dated Dec. 27, 2007, pp. 12.
U.S. Appl. No. 09/820,964—Response to Office Action dated Dec. 28, 2005, filed Mar. 27, 2006, pp. 9.
U.S. Appl. No. 09/820,964—Response to Office Action dated Jan. 25, 2007, filed Apr. 25, 2007, pp. 14.
U.S. Appl. No. 09/820,964—Office Action dated Dec. 28, 2005, pp. 11.
U.S. Appl. No. 09/820,964—Response Office Action dated Feb. 9, 2005, filed Apr. 25, 2005, pp. 13.
U.S. Appl. No. 10/728,356—Response to Office Action dated Sep. 21, 2004, filed Dec. 6, 2004, pp. 25.
U.S. Appl. No. 09/820,965—Response to Office Action dated Jun. 6, 2006, filed Aug. 23, 2005, pp. 10.
U.S. Appl. No. 10/728,356—Response to Office Action dated Jun. 6, 2005, filed Aug. 23, 2005, pp. 18.
U.S. Appl. No. 09/820,964—Office Action dated Nov. 12, 2009, pp. 17.
U.S. Appl. No. 10/728,356—Response to Office Action dated Sep. 30, 2005, filed Mar. 17, 2006, pp. 16.
U.S. Appl. No. 10/727,089—Response to Office Action dated Nov. 28, 2005, filed Mar. 23, 2006, pp. 16.
U.S. Appl. No. 09/820,966—Office Action dated Apr. 18, 2007, pp. 11.
U.S. Appl. No. 09/820,966—Office Action dated Apr. 16, 2008, pp. 25.
U.S. Appl. No. 09/820,964—Advisory Action dated Sep. 20, 2005, pp. 3.
U.S. Appl. No. 09/820,964—Advisory Action dated Nov. 20, 2006, pp. 3.
U.S. Appl. No. 09/820,964—Advisory Action dated Sep. 20, 2007, pp. 3.
U.S. Appl. No. 09/820,964—Response to Office Action dated Mar. 12, 2010, pp. 10.
U.S. Appl. No. 09/820,964—Response to Office Action dated Sep. 3, 2008, filed Feb. 3, 2009, pp. 10.

(56) References Cited

OTHER PUBLICATIONS

U.S. Appl. No. 09/820,964—Response Office Action dated Jun. 27, 2006, filed Oct. 27, 2006, pp. 10.
U.S. Appl. No. 09/820,964—Response Office Action dated Jul. 13, 2005, filed Sep. 6, 2005, pp. 12.
U.S. Appl. No. 09/820,964—Response Office Action dated Jul. 10, 2007, filed Sep. 10, 2007, pp. 14.

SECURE IDENTITY FEDERATION FOR NON-FEDERATED SYSTEMS

CROSS-REFERENCE TO RELATED APPLICATIONS

The present application is a continuation of and claims priority under 35 U.S.C. §120 to U.S. patent application Ser. No. 14/754,653 "SECURE IDENTITY FEDERATION FOR NON-FEDERATED SYSTEMS" filed Jun. 29, 2015, which claims priority under 35 U.S.C. §120 to U.S. patent application Ser. No. 13/886,209 entitled "APPLICATION IDENTITY DESIGN" filed May 2, 2013, which claims priority under 35 U.S.C. §120 to U.S. patent application Ser. No. 13/874,418 entitled "APPLICATION IDENTITY DESIGN" filed Apr. 30, 2013, which claims priority under 35 U.S.C. §120 to U.S. patent application Ser. No. 13/620,208 entitled "APPLICATION IDENTITY DESIGN" filed Sep. 14, 2012, which claims priority under 35 U.S.C. §120 to U.S. patent application Ser. No. 13/335,592 entitled "APPLICATION IDENTITY DESIGN" filed Dec. 22, 2011, which claims priority under 35 U.S.C. §120 to U.S. patent application Ser. No. 12/753,495 entitled "APPLICATION IDENTITY DESIGN" filed Apr. 2, 2010, which claims priority under which claims priority under 35 U.S.C. §120 to U.S. patent application Ser. No. 11/012,639 entitled "APPLICATION IDENTITY DESIGN" filed Dec. 14, 2004, which claims priority under 35 U.S.C. §119(e) from U.S. Provisional Patent Application No. 60/615,314 entitled "APPLICATION IDENTITY DESIGN" filed Oct. 1, 2004, the entire disclosures of which are incorporated herein by reference for all purposes. The present application is also related to U.S. patent application Ser. No. 10/820,650 entitled "TECHNIQUES FOR PROVIDING INTEROPERABILITY AS A SERVICE" filed on Apr. 7, 2004, the entire disclosure of which is incorporated herein by reference for all purposes.

BACKGROUND

This invention relates to access control for computing systems.

Computer security, especially regarding access to sensitive data, is typically done by granting access rights to individual users. As a prerequisite, the user must provide some sort of proof of identity, typically through a password or a digital certificate, such as a Verisign™ X.509 certificate. Other ways to provide a proof of identity include using secure digital keys, various types of biometric identification, or different combinations of authentication methods.

An individual person typically has identity credentials associated with several different systems. In order to ease the process of authenticating to these different systems, the concepts of single sign-on (SSO) and federated identity have been introduced to allow a single set of identity credentials be used for authentication against several applications. At the current time, the SSO and federated identity take one of two schemes.

The first scheme, which is often referred to as the "desktop wallet" scheme, typically has two modes. In the first mode, all applications needing authentication are installed on the same computer and the user has stored authentication credentials into a local credential store on the computer. When the user signs in to a local SSO application on the computer, the authentication credentials are retrieved from the local credential store and are subsequently handed to each of the local applications, as needed. In the second mode of the "desktop wallet" scheme, the SSO application supports HTTP (Hyper Text Transfer Protocol) and HTML (Hyper Text Markup Language) form authentication. In this second mode, the applications are remote, but when the user's local browser encounters a web page needing credentials known to the desktop wallet, the SSO application fills in the required values. The browser then transfers the credentials to the remote application.

In the desktop wallet model, the user has full control of which credentials the SSO application can access and what operations the SSO application is allowed to conduct with the credentials. Examples of the desktop wallet scheme can be found in many shareware, freeware, or shrink-wrapped products supporting single sign-on. The desktop wallet model is sometimes also used in applications that contain single sign-on features, even though the applications themselves may not solely be single sign-on applications In the second scheme, which often is referred to as "federated identity," no credentials are stored on the user's computer. Instead, different services or applications that are accessible over the Internet store the user's credentials. The different services or applications can have different sets of credentials for the same user. The applications participate in an identity federation, that is, the applications use a shared protocol that allows any one (or possibly many) of the user's credentials for an individual application or service to be used by other systems within the federated realm. The federated identity scheme thus allows a user to authenticate herself to one application or service, and then if the user would like to authenticate herself to a second service, the second service can automatically query the first service about whether the user's authentication was approved. If the user's authentication was approved by the first service, the second service can automatically approve the user without requiring a second authentication from the user. The user can also decide whether to exclude any services or applications from the federated identity network, for example, in the event that the user does not trust a particular service or application which is part of the federated identity network. Examples of the federated identity network authentication scheme can be found in concepts such as Microsoft's® Passport and in the protocols developed by the Liberty Alliance™ project.

Although the above solutions typically are sufficient in situations where the different applications are installed on the same machine, and where the applications collaborate in a federated identity network using a shared protocol, there are many situations in which a user needs to access applications on computers or systems that do not collaborate in a federated identity network. Such situations cannot be addressed with the above-mentioned solutions, and the user is thus forced to individually sign on to each application, possibly with different sets of user credentials for each application. This can be both time-consuming and challenging for the user to remember, in particular if the user has multiple credentials set up for different applications and services.

In view of the above, there is a need for providing a solution that enables a user to do a single authentication or sign-on to multiple applications or services that are not installed on the same computer and that do not belong to a common federated identity network. In particular, there is a need to enable various protocol bindings (including third party additions to the protocol binding set) and to maintain confidentiality of the individual user's credentials in such a dynamic environment.

SUMMARY

In general, in one aspect, the invention provides methods and apparatus, including computer program products, implementing and using techniques for providing user credentials over a network to a remote computer application. User credentials for the remote computer application are stored in a central repository that is accessible through the network. A request is sent to a service to perform, on behalf of a user, a particular task involving the remote computer application. It is determined whether the service has been granted permission to act on behalf of the user with respect to the remote computer application. When the service has permission to act on behalf of the user, the service is used to retrieve the user's credentials for the remote computer application from the central repository and to supply the retrieved user credentials to the remote computer application.

Advantageous implementations can include one or more of the following features. The user credentials for a user can be stored in a credential storage area of the central repository, where the credential storage area is associated with a user account for the user. The user's credential storage area can include one or more sets of user credentials, where each set of user credentials corresponds to a particular remote computer application and is of a type that is specified by the remote computer application. The remote computer application can include a description of what type of user credentials are needed from a user in order to access and use the remote computer application. The service can be associated with a particular addressable endpoint on the network that has the same name as the remote computer application with which the service is associated. Permission can be granted to a provider of the service to read one or more sets of user credentials from the user's credential storage area of the central repository. Determining whether the service has been granted permission can include determining whether the provider of the service has been granted read access to the corresponding set of user credentials in the user's credential storage area of the central repository.

A policy can be determined for under what circumstances the service is authorized to act on behalf of the user with respect to the remote computer application, and permission can be granted to a provider of the service to read one or more sets of user credentials from the user's credential storage area of the central repository only when the policy is not violated. Determining whether the service has been granted permission can include determining whether the policy is violated or not, and determining whether the provider of the service has been granted read access to the corresponding set of user credentials in the user's credential storage area of the central repository. The user can be an individual user or an organization representing one or more users. The network can be an interoperability network including functionality for routing messages through the interoperability network and functionality for mediating differences in communication protocol formats between users, services, and computer applications associated with the interoperability network.

In general, in another aspect, the invention provides a system for providing user credentials over a network to a remote computer application. The system includes a network, a central repository and a service. The network connects network nodes that each represents a user, a service, or a computer application. The central repository is accessible through the network and stores user credentials for the computer application. The service receives a request to perform, on behalf of a user, a particular task involving the computer application; determines whether the service has been granted permission to act on behalf of the user with respect to the computer application; and when the service has permission to act on behalf of the user, retrieves the user's credentials for the computer application from the central repository and to supply the retrieved user credentials to the computer application.

Advantageous implementations can include one or more of the following features. The central repository can include several credential storage areas for storing user credentials, where each credential storage area is associated with a user account for the user. The user's credential storage area can include one or more sets of user credentials, where each set of user credentials corresponds to a particular computer application and being of a type that is specified by the computer application. The computer application can include a description of what type of user credentials are needed from a user in order to access and use the remote computer application. The service can be associated with a particular addressable endpoint on the network and can have the same as the computer application with which the service is associated. The system can include a read permission granted to a provider of the service to read one or more sets of user credentials from the user's credential storage area of the central repository. The service can determine whether the service has been granted permission by determining whether the provider of the service has been granted the read permission.

The system can include a policy stating under what circumstances the service is authorized to act on behalf of the user with respect to the remote computer application; and a read permission granted to a provider of the service to read one or more sets of user credentials from the user's credential storage area of the central repository only when the policy is not violated. The service can determine whether the service has been granted permission by determining whether the policy is violated or not, and determining whether the provider of the service has been granted read access to the corresponding set of user credentials in the user's credential storage area of the central repository. The user can be an individual user or an organization representing one or more users. The network can be an interoperability network including functionality for routing messages through the interoperability network and functionality for mediating differences in communication protocol formats between users, services, and computer applications associated with the interoperability network.

In general, in another aspect, the invention provides methods and apparatus, including computer program products, implementing and using techniques for providing user credentials over a network to a plurality of remote computer applications. Several sets of user credentials for a user are stored in a central repository that is accessible through the network. Each set of user credentials represents information that is required by a remote computer application to uniquely identify the user. A single sign on to the network is performed using a single set of user credentials for the user. Several requests are sent to several services, where each request is a request to perform, on behalf of a user, a particular task involving a particular remote computer application associated with the service. For each service that receives a request, it is determined whether the service has been granted permission to act on behalf of the user with respect to the associated remote computer application. For each service that has permission to act on behalf of the user, the service is used to retrieve the user's credentials for the associated remote computer application from the central repository and to supply the retrieved user credentials to the remote computer application.

In general, in another aspect, the invention provides a system for providing user credentials over a network to a plurality of computer applications. The system includes a network, a central repository, a login module, and several services. The network connects several network nodes, where each network node represents one or more of: a user, a service, and a computer application. The central repository is accessible through the network and stores several sets of user credentials for a user. Each set of user credentials represents information that is required by a remote computer application to uniquely identify the user. The login module receives a single sign on to the network from the user, which uses only single set of user credentials for the user. Each service, receives a request to perform, on behalf of a user, a particular task involving a particular computer application associated with the service; determines whether the service has been granted permission to act on behalf of the user with respect to the computer application; and when the service has permission to act on behalf of the user, retrieves the user's credentials for the particular computer application from the central repository and to supply the retrieved user credentials to the computer application.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The present invention provides methods and apparatus for accomplishing a secure identity federation for non-federated systems on an extensible, dynamically routed network. As a result, a user can do a single sign on to the network, and the user's various credentials that are needed by the non-federated systems can be automatically supplied to the systems without the user having to sign on to any individual systems or services. Individual users can retain control over which providers can access the users' credentials, and can manage their own trust relationships according to the functionality they desire. The value of federated identity is provided without requiring the participating applications to implement any particular identity federation protocol. At the same time, due credential security is maintained without limiting the flexibility of providers to produce innovative solutions upon the network.

The invention will now be described in detail by way of example and with reference to specific implementations including the best modes contemplated by the inventors for carrying out the invention. Examples of these specific implementations are illustrated in the accompanying drawings. While the invention is described in conjunction with these specific implementations, it will be understood that it is not intended to limit the invention to the described implementations. On the contrary, it is intended to cover alternatives, modifications, and equivalents as may be included within the spirit and scope of the invention. In the following description, specific details are set forth in order to provide a thorough understanding of the present invention. The present invention may be practiced without some or all of these specific details. In addition, well known features or details may not have been described to avoid unnecessarily obscuring the invention.

Figure 1:
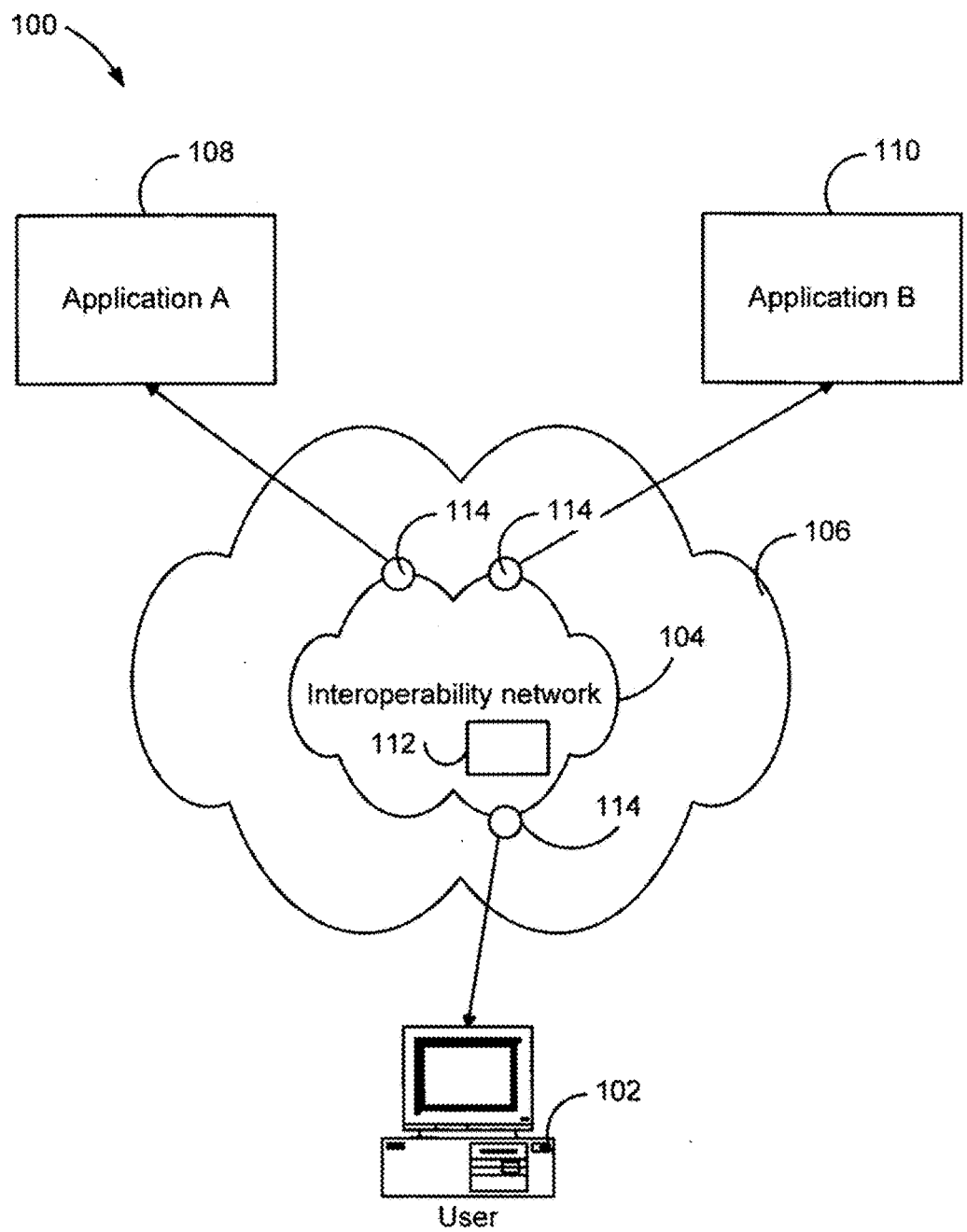
FIG. 1 shows a schematic diagram of a system in which the invention can be implemented.

As shown in FIG. 1, a system (100) in which the invention can be implemented includes one or more users (102), such as individuals or different types of organizations. The users (102) communicate over a communications network (104), such as the Internet, with an interoperability network (106). The interoperability network (106), which will be described in further detail below, contains functionality for facilitating interoperability between users (102) and various applications (108; 110), such as (but not limited to) web services. The interoperability network (106) contains a repository (112) in which the users' credentials for the various applications (108; 110) are securely stored. The storage, access, and use of the users' credentials from the repository (112) will be discussed in further detail below.

The interoperability network (106) facilitates interoperability using, among other things, a wide variety of web services technologies and standards including, for example, Simple Object Access Protocol (SOAP), Web Services Description Language (WSDL), WS-Security, WS-Policy, and Business Process Execution Language (BPEL). One of the core tasks of the interoperability network (106) is to mediate the technology differences in data formats, communications protocols and business policies through a set of established and defined policies.

In general, the term web services refers to a collection of technology standards that enable software applications of all types to communicate over a network. A web service typically facilitates a connection between two applications or services in which queries and responses are exchanged in XML (eXtended Markup Language) over HTTP (or HTTPS). More specifically, the term web services implies the implementation of a stack of specific, complementary standards.

Although not specifically tied to any transport protocol, web services build on Internet connectivity and infrastructure to ensure nearly universal reach and support. In particular, web services take advantage of HTTP, the same connection protocol used by Web servers and browsers. XML (and its corresponding semantics) is a widely accepted format for exchanging data and is a fundamental building block for nearly every other layer in the web services stack. SOAP is a protocol for messaging between applications. The SOAP protocol is based on XML and uses common Internet transport protocols like HTTP to carry its data. WSDL is an XML-based description of how to connect to and communicate with a particular web service. A WSDL description abstracts a particular service's various connections and messaging protocols into a high-level bundle. UDDI (Universal Description, Discovery and Integration) represents a set of protocols and a public directory for the registration and real-time lookup of web services and other business processes. The WSDL description forms a key element of the UDDI directory's service discovery model. Various implementations of the invention employ these and similar technologies to provide interoperability between and among disparate platforms, services or applications as a service.

Specific mechanisms by which interoperability networks (106) can facilitate interaction among a variety of entities will now be described with reference to the accompanying figures. It will be understood that the mechanisms described are merely examples of techniques that can be employed to facilitate the basic functionalities of such interoperability networks. That is, any technologies that facilitate "on-demand" access to a wide range of services are within the scope of the invention.

In a specific example, a service (or set of services) (108; 110) is provisioned by one or more service providers in conjunction with the interoperability network (106). During the provisioning process, connection format and security preferences can be specified for messages received by the services (108; 110), as further described below. In one implementation, provisioning includes setting up a service configuration such that the service can be used by the interoperability network (106). As part of this set up, the services (108; 110) can specify the type of message format they prefer to receive. The respective services (108; 110) can reside either inside or outside the firewall of their service providers.

In some implementations, the service provider can optionally specify which users (102) or services (108; 110) can access the provisioned service (108; 110) and the conditions under which the users or services can have access. It should be recognized that the services (108; 110) can be provided by the provider to any type of entity such as, for example, an individual user from a particular organization or a particular organizational entity. An organization can represent a distinct business entity, a particular user or set of users of a business entity, or an administrative domain of a computer application.

As used herein, the term "service" represents any computer application, process, entity, or device accessible to other applications, processes, entities, or devices through an interface such as an application programming interface (API), user interface, or Internet web user interface by any of a variety of protocols over a network within an entity or over the Internet. A service can also include multiple methods or applications on a single device or distributed across multiple devices.

A service provider can provision any number and type of services (108; 110). Also, any number and type of service providers can provision services (108; 110) to be accessed through the interoperability network (106). Accordingly, the interoperability network (106) can be configured to provision multiple services (108; 110) from multiple service providers.

After services (108; 110) are provisioned, messages can be sent between two or more services (108; 110) through the interoperability network (106). For example, a user (102) associated with a first device can access a particular service (108; 110) on a second device through the interoperability network (106) using a communication process (or service) located on the first device.

The interoperability network (106) can include any number of mechanisms for mediating communications between two or more services (108; 110). In the illustrated implementation, the interoperability network (106) includes a mechanism for translating messages sent between the services, such as from application A (108) to application B (110). Messages can use formats such as MIME (Multipurpose Internet Mail Extensions), DIME (Direct Internet Message Encapsulation), and the like, with AS2 (Applicability Statement 2), SOAP, and other application bindings. MIME and DIME are attachment/part formats, while SOAP and AS2 are application logic binding protocols. Of course, a message can use any suitable type of protocol, structuring, or formatting specification, which results in a particular format for the message. When different entities, such as application A (108) and application B (110), use different formats for their messages, the interoperability network (106) translates the messages such that recipients receive the messages in the appropriate format. In addition to translation of messages, any number of other enrichments can be applied to messages in the interoperability network (106). Such enrichments can include, for example, a digital signature service, a tariff calculator for a purchase order, and so on.

According to various implementations, the services (108; 110) and their service providers need not be aware of the message format requirements of the message destination, nor of any format translation taking place in the interoperability network (106). Application A (108) can send the message as if Application B (110) employed the same message format as used by Application A (108).

The repository (112) or directory of the interoperability network (106) can store, in addition to the user credentials, various information regarding the services (108; 110) and entities that provision and/or use such services. This information can include, for example, user identities, service identities, and policies that control what entities associated with the interoperability network (106) can interact, and the manner in which they can interact. The interoperability network (106) preferably also includes mechanisms for creating and combining services (108; 110), registering users (102) and their identifying information, and handling messages routed between services (108; 110) and/or users (102). The repository (112) can be formed from one or more databases or directory services, including databases or directory services using LDAP (Lightweight Directory Access Protocol), or the like stored on one or more memory devices on one or more computing platforms.

In some implementations of the invention, the interoperability network (106) provides security management including authentication, authorization and security policy enforcement using the information in the directory (112) and policy framework. The interoperability network (106) can perform security management at various points in a message's network lifecycle, for example, when a message is sent into the interoperability network (106) from a service (108; 110), when the message is routed to its destination endpoint, and when the message is delivered out of the interoperability network (106) to its destination service (108; 110). While the following discussion employs the term "service," it will be understood that this is intended to include all application and software entities capable of connecting to and interacting with the interoperability network (106).

Authentication is the process of verifying that users (102) or services (108; 110) interacting through the interoperability network (106) have valid network identities. The authentication process can also involve the interoperability network (106) supplying credentials required by the service (108; 110) to identify the interoperability network (106). Authorization is the process of making sure a service (108; 110) has permission to exchange messages with another service (108; 110). Security policy enforcement allows services to specify the level of security other services must employ to interact with them through the interoperability network (106). For example, if a first service (108) has a security policy of required encryption for data and required password authentication or better, then only services connecting to the interoperability network (106) with a connection security policy that requires at least data encryption will be allowed to exchange messages with the first service. Service providers of services can define equivalent security policies, allowing the interoperability network (106) to consider certain policies to be equivalent to others, though they are not the same, for the purpose of gaining access to services.

According to a specific implementation, a service identity is the network service address of an interoperability network endpoint to which the connecting service wants to be associated. The service proof is the password configured for the associated endpoint. The user identity is a combination of organization and user name. Optionally a service name can be provided with the user identity. The user identity associates the connecting service with the corresponding network user account.

When a service posts a message to the network or polls for a message, the service initiates a connection to the interoperability network (106). The service is authenticated and associated with an endpoint (114) on the interoperability network (106). The interoperability network (106) verifies that the connection security policy of the connecting service (108; 110) is at least as high as the connection security policy defined by the associated endpoint (114). If the authentication and security policy checks pass for a posted message, the message is accepted into the interoperability network (106) and is ready to be routed. Otherwise the message is not accepted and a SOAP fault is returned to the service (108; 110). If the service is polling for a message and verification succeeds, the message requested by the poll is delivered to the service. If security verification fails, a SOAP fault is returned to the service and the polled for message is not delivered.

When connecting to the interoperability network (106) the service (108; 110) supplies a username that identifies the service as an identity on the interoperability network (106). The provided identity associates the connecting service (108; 110) with an endpoint service (114) on the interoperability network (106). In addition, the service supplies a password and/or a client certificate as proof of that identity. In the case of HTTPS connections, the interoperability network (106) provides a server certificate that can be used by the service (108; 110) for authentication of the interoperability network (106).

As mentioned above, each service must connect with a security level that is the same or higher than the connection security policy configured for the service's associated endpoint service which can be configured, for example, for HTTP, HTTPS (HTTP with encryption) or HTTPS with certificate-based authentication.

The interoperability network (106) determines the endpoint (114) associated with a message and routes the message to a message queue associated with that endpoint (114). During this routing phase, security policy and permission verification is performed. If the security policy and permission verification passes, the message is routed to the message queue associated with the destination endpoint (114). If either part of the verification does not pass, the message is not routed and a SOAP fault is returned to the service (108; 110) that originated the message.

Security policies are enforced in a bi-directional manner. That is the security policy of the connecting service's endpoint (i.e., the origin endpoint) and the security policy of the destination service's endpoint (i.e., the destination endpoint) must both be met. For example, if the origin endpoint has a security policy of HTTP, it will allow services that use HTTP or HTTPS to connect. However, the only endpoints the origin endpoint will be allowed to message with are endpoints with a security policy that allows HTTP. That is, endpoints with a security policy of HTTPS or higher will not allow services that connect with HTTP to message with the service associated with them.

Permission enforcement can also be performed during the message routing phase. The destination endpoint has a permissions or access control list policy that is stored in the directory that the network references to determine whether or not the origin endpoint is allowed to exchange messages with this destination endpoint.

When the interoperability network (106) pushes a message to a destination service, the interoperability network (106) can perform authentication of the service (108; 110), can provide authentication credentials to the service (108; 110), and will enforce the connection security policy configured for the endpoint (114) corresponding to the destination service. If authentication verification and security policy validation succeed, the message is delivered to the destination service. If either security verifications fail, the message is not delivered and a SOAP fault is returned to the service that originated the message.

When connecting from the interoperability network (106) to a destination service, the interoperability network (106) can be configured to provide no authentication credentials, to supply a username and/or password, or to authenticate a digital certificate (e.g., a Verisign™ X.509 certificate) sent by the destination service to the interoperability network (106). In addition, the interoperability network (106) can be configured to supply a digital certificate, which the destination service can use to authenticate the interoperability network (106). It will be understood that the foregoing description relating to security management is merely exemplary and that any suitable alternatives for providing any combination of the described functionalities are within the scope of the invention.

In order to accomplish a secure single sign-on (SSO) capability within the interoperability network (106) a novel integration is formed of the above-described protocol transformation and access control capabilities that are present in the interoperability network (106). In addition, the routing meta-data associated with messages and permission definition sets are extended to support the added functionality. Furthermore, a credential storage area is associated with each user account in the repository (112) of the interoperability network (106).

As was seen above, applications (108; 110) can be defined within the interoperability network (106). The applications (108; 110) are identified with a unique name, for example, "Application A" (108) and "Application B" (110). Each application (108; 110) contains a description of what type of authentication credentials are needed from a user (102) in order to access and use the application (108; 110).

For each application (108; 110) that a user would like to access, the user creates an application identity (AppIdentity) entry within the credential storage area that is associated with the user's account in the interoperability network's repository (112). The AppIdentity entry contains the particular credentials for the user (102) for the particular application (108; 110) and must be of the type specified by the application (108; 110). For example, if Application A (108) requires a first string containing a username and a second string containing a password, the user (102) would enter his username and password in his AppIdentity entry in the repository (112). Thus, in the simplified system (100) shown in FIG. 1, a user (102) would have one AppIdentity entry for Application A (108), and another AppIdentity entry for Application B (110) stored in the user's credential storage area of the repository (112). The AppIdentity entry for a particular application (108; 110) can be created and stored in the repository (112) when the user (102) sets up a user account or otherwise provides his credentials to the application (108; 110) for the first time. Alternatively, the AppIdentity entry can be set up in the repository (112) at a later time for applications that have already received the user credentials.

Separately from the user's AppIdentity entries and the applications, a service provider can create a service on the interoperability network (106) that authenticates a user (102) and performs authorized work on behalf of the user (102). In one implementation, such a service is referred to as application instance (AppInstance) and is associated with a particular endpoint (114) on the interoperability network (106). The AppInstance is associated with a particular application (108; 110) through the unique name of the application (108; 110).

In one implementation, the AppInstance also designates one or more application owners (AppOwner) within the service provider's organization. The AppOwner is a special type of user account on the interoperability network (106), and its role in the SSO solution will be described in further detail below. Finally, a special permission is introduced to the interoperability network (106), which will be referred to below as ActAs. An exemplary interaction between the user (102), the application (108; 110), the AppInstance, the AppOwner, the ActAs permission, and the AppIdentity entry will now be explained.

When a user (102) that has created and stored an AppIdentity entry in the repository (112) for a particular application, for example, Application A (108), decides that she trusts a particular service provider to act on her behalf and perform certain operations involving Application A (108), the user (102) grants an ActAs permission to the service provider's organization. The process of granting the ActAs permission is a standard process, similar to granting a read or edit permission against resources. The main difference with the ActAs permission is the actions that the ActAs permission allows, rather than the manner in which the ActAs permission is granted or revoked. By receiving the ActAs permission, each AppOwner within the provider's organization is granted read permission to the AppIdentity entry for Application A that is stored in the user's credential store in the repository (112) and corresponds to Application A (108). In one implementation, the ActAs permission can be a general permission to the service provider's organization to act on the user's behalf and perform certain operations involving any applications for which the user (102) has stored credentials in the repository (112).

Figure 2:
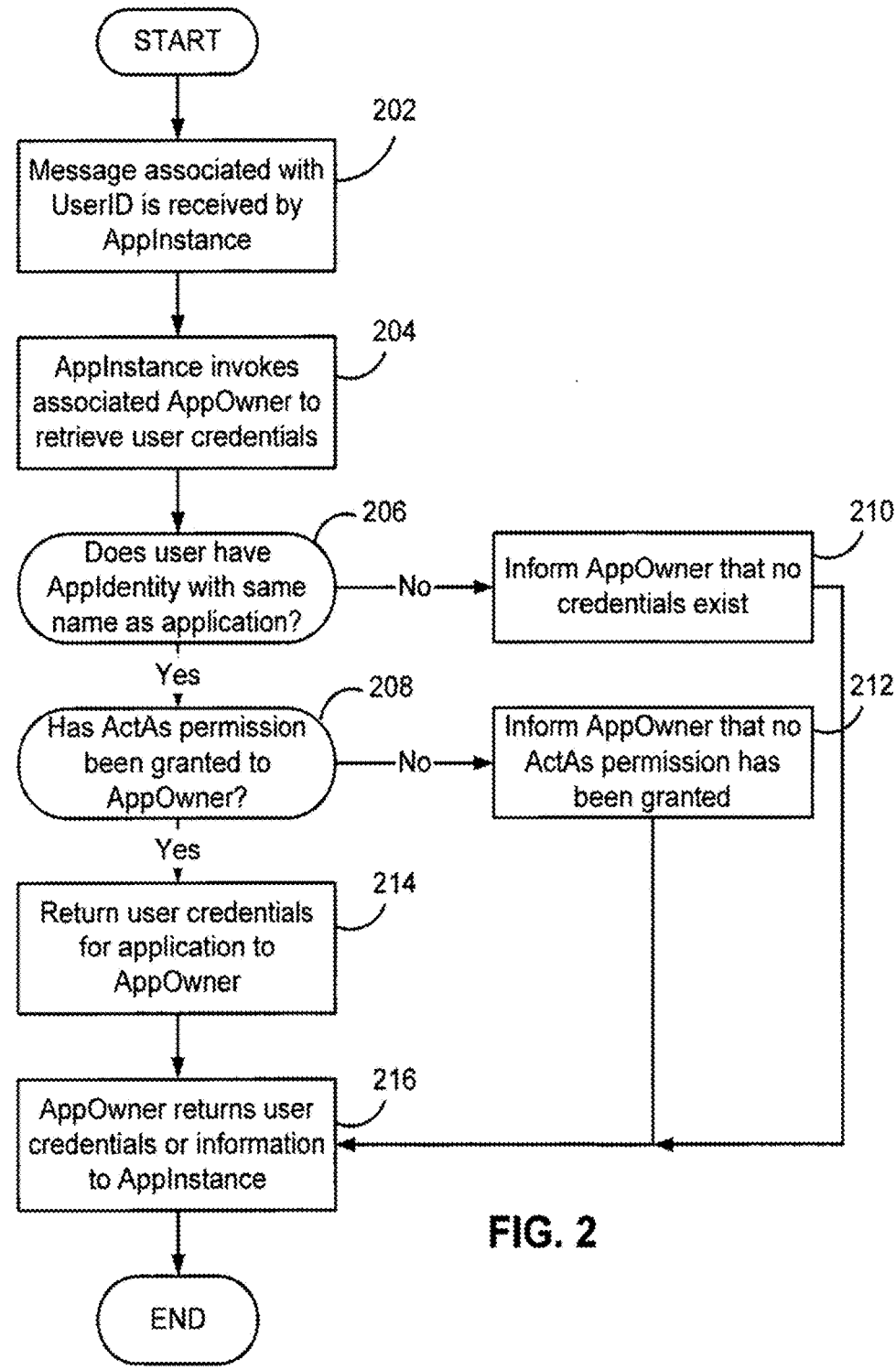
FIG. 2 shows a flowchart for a process that illustrates the operation of the single sign on functionality of the interoperability network of FIG. 1.

FIG. 2 shows a flowchart for a process (200) that illustrates the operation of the SSO functionality of the interoperability network at runtime. In FIG. 2, it is assumed that the user is signed on to the interoperability network (106) and previously has set up AppIdentity credentials for a particular application, such as Application A (108). It is further assumed that Application A (108) has an associated AppInstance that is provided at an endpoint (114) by a service provider on the interoperability network (106), and that the user (102) wishes to send a message to Application A (108) through this associated AppInstance.

As can be seen in FIG. 2, the process begins by a message being received by the AppInstance (step 202). As is the case for all messages that travel through the interoperability network (106), the message contains associated metadata that includes, among other things, information identifying the user (102) that submitted the message. Next, the AppInstance invokes the AppOwner that is associated with the AppInstance to attempt to retrieve the user's credentials for Application A (step 204). The AppOwner knows where to search for the credential information, since the received message has an associated user identity, and the AppInstance contains the application name, that is, "Application A," which is identical to the name of the corresponding AppIdentity entry in the repository (112).

The process then checks whether the user (102) associated with the message has an AppIdentity entry in her credential store that has the same unique name as the application (step 206). If the user has an AppIdentity with the same unique name as the application, the process continues to step 208, which will be described below. If the user does not have an AppIdentity with the same unique name as the application, the process continues to step 210, where the AppOwner is informed that no credentials exist for the user.

When the process determines in step 206 that an AppIdentity entry with the same name as the application exists, the process checks whether the user (102) has granted the ActAs permission to the AppOwner (step 208). If the user (102) has granted the ActAs permission to the AppOwner, then the process returns the user's credentials to the requesting AppOwner (step 214), which in turn passes the credentials to the invoking AppInstance (step 216). This means that the AppInstance is now permitted to perform work authorized by the user (102) with respect to Application A (108), and ends the authentication process. If it is determined in step 208 that the user (102) has not granted any ActAs permission to the AppOwner for the AppInstance, the process continues to inform the AppOwner that no ActAs permission has been granted (step 212) and the AppOwner returns this information to the invoking AppInstance, after which the process ends. Optionally, the user (102) can be informed whenever an AppOwner attempts to retrieve credentials from her credential store in the repository (112). The information that is sent to the user can, for example, be which AppOwner tried to access the credentials, which AppInstance generated the request to access the credentials, which AppIdentity entry was involved in the transaction, which service provider is responsible for the AppInstance, what was the outcome of the attempt to access the credential information, and so on. Based on this information, the user (102) can revoke or modify the ActAs permissions if different unauthorized attempts to access her credentials are being made.

Since the interoperability network (106) presents service providers with a powerful set of tools in order to support dynamic routing through the interoperability network (106), it is in practice unviable to analyze the actual usage that the different services make of the users' credentials. Therefore, the model presented above requires that the users explicitly permission a provider to be able to use the users' credentials, through the ActAs permissions, and thus the trust relations between users and service providers remain in the users' control.

In one implementation, the users (102) can not only grant ActAs permissions to various AppOwners, but also revoke permissions or assign permissions that are based on policies. For example, a user (102) at Company X can define a policy stating that under no circumstances should his messages pass through an AppInstance hosted by his competitor, Company Y. Another example of policy use is as follows: the user (102) can require that whenever his credentials are used, the transmission of his credentials be encrypted, or even that all transmissions within a particular session be encrypted. Yet another example is that when the credentials required for an application consist of an X.509 certificate, the user can require that authentication within the session be certificate authentication or better. Many other types of similar examples can be constructed that fall within the general principles of the invention as described herein.

One fundamental property of the interoperability network (106) that enables the above-described functionality is the ability to store user credentials (that is, the AppIdentities) in a central repository (112) within the interoperability network (106). Another fundamental property of the interoperability network (106) that enables the above-described functionality is that the interoperability network (106) controls the traffic flowing through the interoperability network (106) and has the ability to bind permissions and policies to endpoints (114) within the flow pattern of a message through the interoperability network (106). As a result, a user (102) has complete control over which services can access his credentials, and this access can be done automatically as soon as the user (102) has identified himself to the interoperability network (106) through a single sign on.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, can be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system can be specially constructed for the required purposes, or it can be a general-purpose computer selectively activated or configured by a computer program stored in the computer. The processes presented above are not inherently related to any particular computer or other computing apparatus. In particular, various general-purpose computers can be used with programs written in accordance with the teachings herein, or, alternatively, it can be more convenient to construct a more specialized computer system to perform the required operations.

A number of implementations of the invention have been described. Nevertheless, it will be understood that various modifications can be made without departing from the spirit and scope of the invention. For example, there can be organizational groupings of users (102) that share the same AppIdentities. Also, the bindings to policy can be asserted by the application definition, the AppOwner, or, for the case that the AppIdentity is for a group of users, the administrator of that AppIdentity. For example, for an organization that uses the same certificate for all users to authenticate to a particular application, the required policies are defined by the organization rather than the individual users or in addition to the individual users.

The invention claimed is:

1. A method of providing a unified access to systems, the method including:
    storing a plurality of sets of user credentials for a plurality of remote computer applications in a central repository accessible via an interoperability network, wherein the plurality of remote computer applications include non-federated entities that do not share a common identity verification protocol;

receiving an interoperability network credential that authorizes a user to use the plurality of remote computer applications and access the stored plurality of sets of the user credentials;

verifying that an intermediary service coupled to the interoperability network, upon receiving a request to perform, on behalf of the user, a particular task that requires access to and task performance by a particular remote computer application from the plurality of remote computer applications, has authorization to act on behalf of the user in obtaining authorized access to and task performance by the particular remote computer application; and upon verification of authorization, automatically supplying the intermediary service with particular user credentials for the particular remote computer application from the central repository.

2. The method of claim 1, further including for a plurality of intermediary services coupled to the interoperability network, receiving a selection specifying at least one intermediary service to act on behalf of the user by accessing user's credentials.

3. The method of claim 1, further including receiving instructions specifying a degree of authorization of the intermediary service.

4. The method of claim 1, wherein the particular remote computer application is an on-demand service.

5. The method of claim 1, wherein the intermediary service is an on-demand service.

6. The method of claim 1, wherein verifying that the intermediary service has authorization includes checking a policy to determine conditions that the user has set for the intermediary service to act on behalf of the user.

7. The method of claim 1, further including retrieving user credentials for the particular remote computer application and applying an enrichment prior to automatically providing the particular user credentials to the particular remote computer application.

8. The method of claim 7, wherein the enrichment includes at least one of a digital signature and a tariff calculator for a purchase order.

9. The method of claim 1, further including sending a notification to the user when the intermediary service accesses user credentials of the user.

10. The method of claim 9, wherein the notification identifies at least one of:
the intermediary service;
the particular remote computer application for which the user credentials were accessed;
a user account associated with the user credentials; and
an outcome of the intermediary service accessing user credentials of the user.

11. The method of claim 9, further including, in response to sending the notification, receiving instructions from the user for at least one of:
revoking authorization of the intermediary service to act on behalf of the user; and
modifying authorization of the intermediary service to act on behalf of the user.

12. A system of providing a unified access to systems, the system including:
one or more processors coupled to memory storing computer instructions that, when executed on the processors, implement actions including:
storing a plurality of sets of user credentials for a plurality of remote computer applications in a central repository accessible via an interoperability network, wherein the plurality of remote computer applications include non-federated entities that do not share a common identity verification protocol;

receiving an interoperability network credential that authorizes a user to use the plurality of remote computer applications and access the stored plurality of sets of the user credentials;

verifying that an intermediary service coupled to the interoperability network, upon receiving a request to perform, on behalf of the user, a particular task that requires access to and task performance by a particular remote computer application from the plurality of remote computer applications, has authorization to act on behalf of the user in obtaining authorized access to and task performance by the particular remote computer application; and upon verification of authorization, automatically supplying the intermediary service with particular user credentials for the particular remote computer application from the central repository.

13. The system of claim 12, further configured to receive, for a plurality of intermediary services coupled to the interoperability network, a selection specifying at least one intermediary service to act on behalf of the user by accessing user's credentials.

14. The system of claim 12, further configured to receive instructions specifying a degree of authorization of the intermediary service.

15. The system of claim 12, wherein the particular remote computer application is an on-demand service.

16. The system of claim 12, wherein the intermediary service is an on-demand service.

17. The system of claim 12, wherein verifying that the intermediary service has authorization includes checking a policy to determine conditions that the user has set for the intermediary service to act on behalf of the user.

18. The system of claim 12, further including retrieving user credentials for the particular remote computer application and applying an enrichment prior to automatically providing the particular user credentials to the particular remote computer application.

19. The system of claim 18, wherein the enrichment includes at least one of a digital signature and a tariff calculator for a purchase order.

20. A non-transitory computer readable medium storing a plurality of instructions for programming one or more processors to provide a unified access to systems, the instructions, when executed on the processors, implementing actions including:
storing a plurality of sets of user credentials for a plurality of remote computer applications in a central repository accessible via an interoperability network, wherein the plurality of remote computer applications include non-federated entities that do not share a common identity verification protocol;

receiving an interoperability network credential that authorizes a user to use the plurality of remote computer applications and access the stored plurality of sets of the user credentials;

verifying that an intermediary service coupled to the interoperability network, upon receiving a request to perform, on behalf of the user, a particular task that requires access to and task performance by a particular remote computer application from the plurality of remote computer applications, has authorization to act on behalf of the user in obtaining authorized access to and task performance by the particular remote computer application; and upon verification of authorization, automatically supplying the intermediary service with particular user credentials for the particular remote computer application from the central repository.

\* \* \* \* \*